May 7, 1974  M. H. THELY  3,809,760
CALCIUM SALT OF N-ACETYL-6-AMINO-HEXANOIC ACID AND MEDICAMENTS
CONTAINING THIS SALT
Filed Sept. 22, 1970
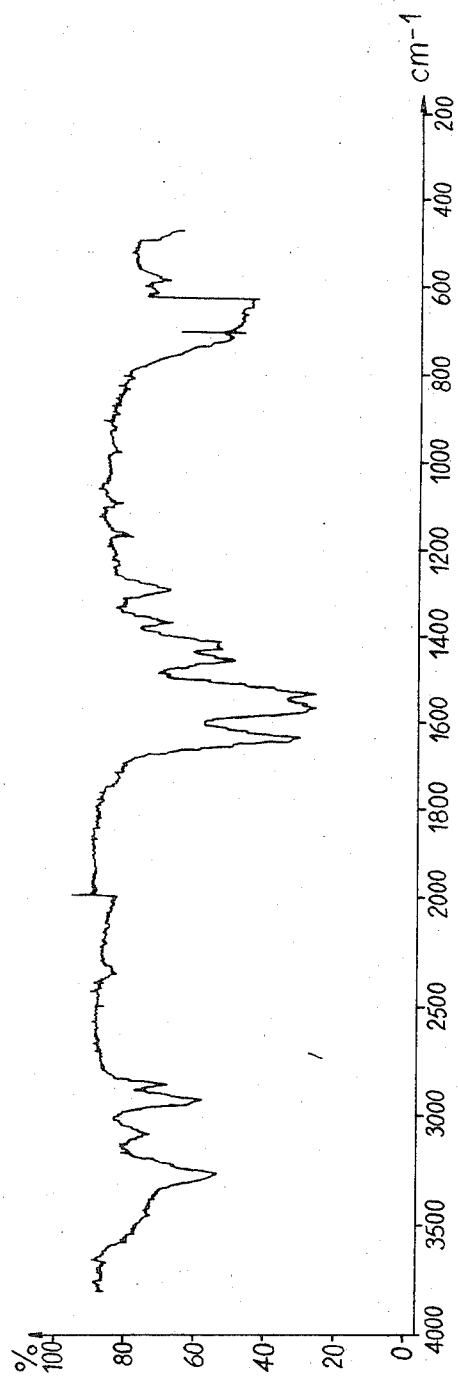
INVENTOR
Maurice H. Thely
BY Fleit, Gipple & Jacobson
ATTORNEYS

United States Patent Office 3,809,760
Patented May 7, 1974

3,809,760
CALCIUM SALT OF N-ACETYL-6-AMINO-
HEXANOIC ACID AND MEDICAMENTS
CONTAINING THIS SALT
Maurice H. Thely, Paris, France, assignor to
Choay S.A., Paris, France
Filed Sept. 22, 1970, Ser. No. 74,286
Claims priority, application France, Sept. 25, 1969,
6932798
Int. Cl. A61k 27/00
U.S. Cl. 424—319
4 Claims

ABSTRACT OF THE DISCLOSURE

The invention relates to the calcium salt of N-acetyl-6-amino-hexanoic acid and new medicaments based thereon. The new salt is prepared by reacting calcium hydroxide or calcium oxide with acexamic acid. It can be used alone or in association with other active substances in treatments favoring tissular repair disturbed by pathological affections of the conjunctive tissue.

---

The invention relates to a new salt of N-acetyl-6-amino-hexanoic acid, also known under the name of acexamic acid (under which name this acid will be designated in the description which follows for convenience of language) and to new medicaments of which the active principle is constituted by this salt, and to the processes for their manufacture.

It is known that acexamic acid constitutes a medicament or the active principle of medicaments of value, especially in pathologies of cutaneous cicatrization and of osseous consolidation. By reason, however, of its very marked acidity, it is generally used in a form of its sodium salt.

Until now, however, it has not been possible to manufacture pharmaceutical compositions based on acexamic acid in other forms, for oral administration, than liquids. In fact, the sodium salt of acexamic acid is characterized by such hygroscopicity that it is never obtained in a pure state. In particular, it has only ever been identifiable by methods applicable to solutions, especially by thin layer chromatography or by gaseous phase chromatography.

Considering that the quantities of the active substances usually prescribed in the above indicated treatments are in general rather large, the patients have to absorb daily also rather large volumes of liquid (for example an ampoule of 20 ml. containing 5 g. of acexamic acid three to four times per day), which constitutes a drawback all the most serious (especially when the medicament must be administered to children) as these compositions have a very disagreeable taste.

In addition, the preparation of solutions of the sodium salt by neutralization of a solution of acexamic acid with soda, is particularly delicate, even the necessity for maintaining the pH of these solutions within limits which render them physiologically acceptable.

It is an object of the invention to overcome the drawbacks and, especially, to provide medicaments based on acexamic acid in the solid form, concentrated in the active substances and easily flavorable, and, in addition, the manufacture of which is easy.

The medicaments according to the invention are characterized by the use as active principle of the calcium salt of acexamic acid of formula

[CH$_3$CONH(CH$_2$)$_5$COO]$_2$Ca this salt itself also constituting a novel industrial product.

The process according to the invention for obtaining this salt comprises reacting a solution of acexamic acid with the hydroxide or oxide of calcium. Advantageously the latter are used in powder or in aqueous paste.

It has in fact been noted that, in surprising way, the calcium salt of acexamic acid, which had never hitherto been prepared, is not hygroscopic in practice, so that it can be preserved without the least difficulty in the open air, this salt preserving nevertheless all the therapeutic activity of the acexamic acid and being itself also devoid of toxicity at even the large doses in which its administration to patients is considered.

Due to the fact of its absence of hygroscopicity, this salt can be administered to patients, particularly in a form of granules, which constitutes a considerable advantage, since such compositions are much more handable, and contain much greater doses of the substance per unity volume, whilst any attempt to manufacture granules based on sodium acexamate lead rapidly to compact paste, by the continuous absorption of the moisture of the atmosphere.

In addition the calcium salt exhibits a taste attenuated to an extent such that it can be completely overcome by the flavoring of the compositions, even highly concentrated in calcium acexamate, prepared for administration to human patients.

The possibility of using the new salt in solid form, also enables the preparation of therapeutic compositions in which it is associated to other active principles, such as for instance bismuth, which are used in solid form. Such associated drugs could not, at most hardly, be envisaged with the sodium salt of acexamic acid.

Though less hygroscopic than the calcium salt, the magnesium salt, which has also been prepared by applicant, cannot be shelved for prolonged periods either. Its transformation into granules is difficult, because of its hygroscopic character which, even though reduced, is not negligible. Above all its taste is even more disagreeable than that of the sodium salt and it cannot be overcome by the most forced flavoring. As a result the absence of hygroscopicity and the far less disagreeable taste of the calcium salt are all the most surprising as they could not be expected.

The invention will be in any case illustrated below, of course, in nonlimiting manner, by a supplementary description relating to certain methods of preparation of this salt, given by way of example, and to the description of some pharmacological data and to formulations, also by way of example, of some preferred pharmaceutical compositions.

Calcium acexamate, of which the single figure in the accompanying drawings, shows a curve representative of its infrared spectrum, has in particular been prepared as follows.

Starting with 173 kg. (1000 moles) of acexamic acid emulsified in 225 liters of demineralized water at 60° C., there is slowly added thereto with vigorous stirring, without emulsifying with air, either 28 kg. of calcium oxide, or 37 kg. of calcium hydroxide, in powder or in aqueous paste. After complete solution of the reactants, the pH is adjusted to 8.5, by means of one of the above said reactants. The temperature rises to 70–80° C. It is filtered at this temperature on cellulose or on starch (or on a mixture of the two) and the filtrate slowly cooled to 20° C.

The calcium acexamate crystallizes. The crystals are dried, washed with a volume of demineralized water equal to that of the crystals, dried in an oven at a temperature, preferably below 60° C.

A second crop of crystals is obtained from the crystallization mother liquors, either by subjecting them to additional cooling to a temperature of the order of +4° C., or by concentrating them under vacuum. The crystals obtained are recovered and washed under the same conditions as those of the first crop.

There are obtained in total 160 kg. of calcium acexamate.

Here again also, according to a variation relative to the recovery of the calcium acexamate, when the starting calcium hydroxide or oxide is very pure, it is possible to cool the filtrate directly and rapidly towards 20° C. The calcium acexamate then forms in a mass. The mass is dried, preferably under vacuum and at a temperature below 60° C.

The abovesaid filtrate can also be treated with a solvent miscible with water such as acetone, menthanol, ethanol, etc. with stirring and with cooling to a temperature around 0° C. The calcium acexamate crystallizes in a very pure form: it is recovered by drying, decantation or filtration, then dried in an oven, preferably under vacuum, at a temperature below 60° C.

The calcium acexamate is in the form of the monohydrate

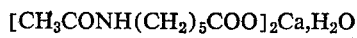

[CH$_3$CONH(CH$_2$)$_5$COO]$_2$Ca,H$_2$O

It decomposes before melting. It is a white powder, soluble in water and in alcohol, insoluble in acetone and in ether. The N-acetyl-6-amino-hexanoic radical is characterized by its infrared spectrum, the calcium ion by the chemical reactions characteristic of calcium or by atomic spectrophotometric absorption. The infrared spectrum of calcium acexamate is shown in the figure in which the variations of the frequencies of the infrared radiations absorbed are expressed in cm.$^{-1}$ on the axis of abscissae and the corroesponding variations of the infrared absorption by percentage transmission on the axis of the ordinates.

The calcium salt of acexamic acid is characterized in addition by an absence of toxicity at doses at which it is capable of being administered to man or to an animal in the sphere of treatment designed to favor cutaneous cicatrization or osseous consolidation. In fact the lethal dose 50 (LD 50) in the rat, by the oral route, determined according to the graphical method of Litchfield and Wilcoxon is 12.66 g./kg. for calcium acexamate.

The absence of toxicity has also been established by study of the possible effects of administration of the composition based on calcium acexamate, described below in Example 3, in the rabbit and in the rat in the respective amounts of 300 mg./kg. per day and of 1 g./kg. per day for three months. The development of the weight curves, macrosopic and microscopic study of the organs at the end of these three months have shown that the animals had not undergone any alteration of their general condition, no departure with respect to their normal weight growth curve, and their main viscera wore no lesion which could be attributed to a possible toxic effect of the substance tested.

The particularly effective action of the calcium salt as an agent favoring any tissue repair disturbed by a pathological affection of the conjunctive tissue has, in particular, been established by the following tests.

A—Action on the cutaneous conjunctive tissue

The action of the calcium salt of acexamic acid on the cutaneous conjuctive tissues, has been studied in the rat and in the mouse by means of different tests.

a—Action on burns produced by UV rays.—The hair is removed from a dorsal surface of the skin of the rat, which is then exposed to UV rays produced by an MLH Philips lamp of 300 w. for ten minutes, the source of radiation being placed at a distance of 50 cm. from the animal. There is thus obtained a serious burn substantially similar to sun burn.

The animals receive applications of ointment containing 5% of active substance (calcium acexamate), the ointment being applied in the amount of 1 g./day twice per day for four consecutive days.

The results are compared with those obtained on a series of control animals.

There is observed in the treated animals, in contrast with what occurs in the control animals, the rapid disappearance of blisters whilst desquamation is slight.

b—Action on the stretching of a cutaneous flap in the aged rat.—The measurement is made by applying a force of 50 g. for five minutes on a cutaneous flap of 3 cm. in length on 0.50 cm. width and by measuring the length of the cutaneous flap without releasing the traction. When the weight is removed the fragment returns to its initial length.

It is observed that applications of ointment of the order of 1 g. of anointment containing 5% of active substance, per day and per animal for a period of a month, enable a greater elongation to be obtained than in control animals not treated or treated with a placebo ointment.

It is noted in addition, by means of another test, that this substance acts on the epidermis by increasing its trophicity. The test concerned is constituted by study of the retraction of a cutaneous flap in the castrated mouse. A predetermined surface of a piece of skin of 225 mm.$^2$ is delineated on the back of the mouse. Contours are drawn on the skin at the back of the mouse in the treated zone, and it is cut with fine scissors. The retracted surface is measured promptly, with a lens, on a millimeter paper.

It is observed that applications of 50, 10 and 2 mg. of an ointment containing 5% of active substance, per animal and per day, enable a greater retraction to be obtained of the cutaneous flaps with respect to that which occurs in the control animals or in those receiving a simple placebo, this for a treatment of a duration of five weeks.

The comparative histological study of thte skinks of aged rats and castrated mice, and treated, has shown the presence of mucopolysaccharides in the dermal conjunctive tissue, and of normal collagen fibres. This structure donates a better elasticity on the integument.

c—Action on an experimental wound.—This action has been studied in the rat by using a model of an experimental wound with artificial cicatrization delayed by means of croton oil.

The calcium salt of acexamic acid is administered in doses of 300 mg./kg./day by the oral route.

At these doses, this substance accelerates the process of cicatrization and enables a good quality scar to be obtained. From the histological point of view, it is noted that the repair tissue is formed by normal conjunctive tissue, well vascularized and of slight fibrocity, which favors rapid epithelialization.

B—Action on the osseous conjunctive tissue

The action of the calcium salt of acexamic acid on osseous conjunctive tissues has been studied in the Wistar rat. The technique consists of producing a fraction which is neither reduced nor splinted.

The results obtained have been studied by means of clinical, radiographic and histological examinations.

The doses of active substance administered have been 100, 200 and 300 mg./kg. per day and per animal.

The results obtained in the treated animals have been compared with those obtained in control animals, and it is noted that, in the treated animals, the optimal conditions of ossification of fracture callus are more rapidly developed, the development of the stages is more rapid and the phenomena are more overlapping.

In the treated animals, ossification is obtained in the majority of cases at the 35th day, whilst in the control animals it only occurs towards the 45th day.

C—Action of the calcium salt of acexamic acid on the fibrous conjunctive tissue (tendons)

Experiment has been carried on German shepherd dogs, these animals (of which certain were controls) having undergone section of two tendons of one of the rear paws (a rear tendon, homologous to the Achilles tendon in man, and a long extensor front tendon of the fingers).

The treated animals received the calcium salt of acexamic acid, at the amount of 300 mg./kg. per day, by the oral route. To study the cicatrization of the tendons, the histological specimens were taken for five days in five, from the 5th to the 30th day.

The results are as follows:

In the controls, the tendons remain voluminous, irregular, poorly consolidated, until the 30th day. In the treated animals, the sectioned tendon is cicatrized and has an appearance comparable with a normal tendon from the 30th day.

Moreover the peritendinous atmosphere which is sclerosic and no longer permits slipping of the tendon in the untreated series, is on the other hand normal and non-fibrous and enables the functional slipping of the tendon, in the animals which had received the calcium salt of acexamic acid.

D—Action on the conjunctive tissue of organs

The action of the calcium salt of acexamic acid on the conjunctive tissues of organs has been established by two tests, namely: experimental pancreatitis of the dog and peritoneal adhesions caused in the cat.

a—Action of the calcium salt of acexamic acid on experimental pancreatitis in the dog.—The experimental pancreatitis of the dog was caused according to a procedure carefully established by using intracanalar injections of a mixture of pancreatic lipase and of bile.

The calcium salt of acexamic acid was administered by the oral route from the third day at the rate of 300 mg./kg. per day, some of the animals, serving as controls, not receiving any treatment.

An exploratory laparotomy was carried out on all the animals 30 days after the start of the treatment.

The results were as follows:

Control animals: macroscopically, sclero-atrophic pancreas; microscopically: very considerable fibrosis, choking the glandular ascinia.

Treated animals: macroscopically: pancreas substantially normal; microscopically there was only noted some small spans of fibrosis, the glandular ascinia were normal.

b—Action of the calcium salt of acexamic acid on peritoneal adhesions in the cat.—The peritoneal adhesions were caused by applying talc to the peritoneum after laparotomy.

The calcium salt of acexamic acid was administered, by the oral route from the first day at the dose of 300 mg./kg. per day.

All the animals, including the controls, were checked on the 25th day.

There was observed in the majority of the controls adhesions and very large peritoneal threads fixing the loops of the small intestines and the large intestine in a fibrous matrix.

On the contrary, the majority of treated animals showed practically no modification of the peritoneal cavity, at the most, extremely fine threads for certain among them.

E—Action on gastric ulcers

The curative action and preventive action of the calcium salt of acexamic acid have been tested on the pharmacological level by means of two experimental models, on one hand, the stressed ulcer, on the other hand, the phenylbutazone ulcer. These experiments were carried out by comparison between the treated animals and the control animals, the treated animals receiving per day 300 mg./kg. by two daily force-feeds at eight hours interval, plus the administration during the night in the drinking water. The two criteria used to judge the action of the product were, on one hand the presence of mucous, on the other hand histological observation of cicatricial tissue.

It was possible to observe that this substance exerted a preventive action with respect to the stress ulcer and the phenylbutazone ulcer, and a cicatrizing action, especially with regard to the stress ulcer. In addition, it was possible to establish a mucigenic power of this substance.

These tests show hence establish the evidence that the calcium salt of acexamic acid has wholly preserved the pharmacological properties of acexamic acid, hence the therapeutic value of this salt. Its greater facility of use, by reason especially of its absence of hygroscopic character—as well as the possibility of suppressing any bad taste—renders its use particularly advantageous in medicaments intended to encourage all tissular repair disturbed by pathological affection of the conjunctive tissue.

These substances can in addition be used in associations bringing into play other active substances normally intended for the treatment of different disorders which can however be accompanied by processes bringing into play pathological affections of the conjunctive tissue, the substances according to the invention being then able to contribute either to their healing, or to their prevention.

Such will be for example the case of the association described in Example 3 (association of the calcium salt of acexamic acid and bismuth) which will be particularly advantageous in the treatment especially of gastric, duodenal, and peptic ulcers, in infectious or parasitic colites and of primary or secondary ulcero-hemorrhagic recto-colites, the salt of acexamic acid of the association acting, especially in the case of colites, to prevent or heal ulcerations which can accompany it.

The great flexibility of the substances according to the invention will be particularly well established by the non-limiting examples of pharmaceutical compositions which can be used in view to administration in man. If the substances according to the invention can be used in various formulations of granules (Examples 1 and 2) or in associations (Example 4) they can naturally be also used in the forms already in use for the known derivatives of acexamic acid (Examples 5 to 9).

EXAMPLE 1

Ordinary granules containing as active substance the calcium salt of acexamic acid.

Formula per dosage unit: G.
  Active substance _____ 5
  Saccharine _____ 0.030
  Citric acid _____ 0.20
  Orange flavoring _____ 4.5
  Sugar q.s.p. _____ 12

EXAMPLE 2

Effervescent granules containing as active substance the calcium salt of acexamic acid.

Formula per dosage unit:                    G.
  Calcium acexamate _____   5
  Saccharine _____   0.030
  Citric acid _____   1.65
  Bicarbonate of soda _____   0.9
  Orange flavoring _____   4
  Powdered essence of orange _____   0.03
  Sugar q.s.p. _____   12
  pH _____    4.6

EXAMPLE 3

Ordinary granules containing in association the calcium salt of acexamic acid and bismuth.

Formula per dosage unit:                    G.
  Light bismuth nitrate _____   5
  Calcium acexamate _____   3
  Saccharine _____   0.030
  Citric acid _____   0.15
  Orange flavoring _____   4.5
  Sugar q.s.p. _____   15

EXAMPLE 4

Ointment containing as active substance the calcium salt of acexamic acid.

Percentage formula:                         G.
  Active substance _____   5
  Sorbic acid _____   0.2
  Excipient known under the name of "perhydrosqualene" _____   7
  Lipidic substance forming an autoemulsifiable mass in water and known under the designation "Xalifin 15" _____   22
  Demineralized water q.s.p. _____   100

EXAMPLE 5

Cream containing as active substance the calcium salt of acexamic acid.

Percentage formula:                         G.
  Calcium acexamate _____   5
  Potassium sorbate _____   0.4
  Polyethylene glycol stearate-isostearate and glycerine associated with an oxyethylene derivative of fatty alcohol known under the designation "Base 1407" _____   10
  Wax _____   0.5
  Perhydrosqualene _____   2
  Mixture of equal parts of cetyl alcohol and stearyl alcohol known under the designation "Lanette O" _____   10
  Wheat germ oil _____   2
  Demineralized water q.s.p. _____   100

As a result of which there are obtained new medicaments which can be used with advantage in:

—the treatment of disorders of cutaneous cicatrization,
—the treatment of disorders of osseous consolidation and more particularly:

delays in consolidation of fractures,
pseudo-arthroses,
post-traumatic or post-surgical articular stiffenings,
the treatment of post-traumatic or post-surgical tendinous retractions,
treatment and prevention of sclerosis of the pancreas occurring as a result of oedematous or hemorrhagic acute pancreatitis,
treatment and prevention of pleuro-pulmonary fibrous sequelae intervening in the course of consolidation of pleuro-pulmonary tuberculoses,
treatment and prevention of disorders of peritoneal thread and adhesions,
treatment, for a reminder, of gastric, duodenal, peptic ulcers, of ulcerations produced in the course of infectious or parasitic colites and primary or secondary ulcero-hemorrhagic recto-colites.

In all these treatments, especially those in which the administration of the medicament is done by the oral route; the daily doses will advantageously be from 100 to 500 mg./kg., preferably from 200 mg./kg. to 300 mg./kg. per day of the calcium salt of acexamic acid.

By way of example there is indicated below the results obtained in a clinical study.

The patient, aged 33 years, suffered intermittently, from 4 years of age, from epigastric pains, continuous during the day, sometimes accompanied by retro-sternal burnings and also several vomitings tinted with blood. For a month, there was observed the repetition of the same pains allayed by eating, and constipation to the extent of one stool every two to three days, although up to that time intestinal passage was regular. There was noted a distinct epigastric sensitivity with parietal resistance.

An X-ray photograph, taken at this stage, showed a typical niche, of 3 to 4 mm., situated on the front side of the small middle curve of the stomach.

The patient was treated with the granules of Example 4, at the rate of three dosage units (totalling 9 grams of calcium acexamate) per day.

The pains diminished until the third day of treatment to disappear at the end of 8 days. The patient complained only of increased constipation from the start of the treatment, to the point that she had to take a deconstipating medicament. However, at the end of this treatment (21 days) the patient had regained 5 kg.

An X-ray control photograph enabled the disappearance of the image of the niche of the small vertical curve in its middle portion to be observed and a complete flexibility of the folds of the region under calibrated compression. No impediment of the polyoroduodenal passage persisted.

A more extensive series of clinical tests was carried out on three types ulcers, trophic ulcers in lepers, gastroduodenal ulcers and recto-colic ulcers respectively.

a—Trophic ulcers in lepers.—10 leprous patients having trophic ulcers of comparable surface and depth, with immobilization by plaster windowed at the level of these ulcers, were treated for 5 weeks with sachets of granules, each containing 1 dosage unit of the granules of Example 1, at the rate of three sachets per day.

There was observed at the end of 5 weeks, three complete scars and three other scars practically completed, which constitutes a result all the more interesting when one remembers the extreme difficulty of obtaining scars of this type of ulcer.

b—Gastro-duodenal ulcers.—86 patients having gastroduodenal ulcers were treated with sachets of granules, each of these sachets containing one dosage unit according to the abovesaid Example 2, at the rate of three sachets per day. After 3 weeks of this treatment, there was observed complete healing of these ulcers at the clinical level and in 92% of the cases at the radiological level.

c—Recto-colic ulcers.—21 patients having recto-colical ulcerations, examined by rectoscopy before and after treatment, received the same treatment as those under (b) above. There was observed at the end of 8 days of this treatment a complete cicatrization of all these ulcerations.

These clinical trials show obviously the remarkable properties of medicaments based on the calcium salt of acexamic acid, of which the advantages (activity, variety of presentation, solid or not, in association or not with other active principles, corrected taste) result sufficiently from the preceding description not to require further details.

As it goes without saying, and as these results furthermore already from what has preceded, the invention is not limited in any way to that of its embodiments, neither to those embodiments of its diverse parts, which have been more particularly envisaged; it embraces, on the contrary, all variations.

I claim:

1. A solid pharmaceutical composition for promoting tissular healing comprising an effective amount of the calcium salt of N-acetyl-6-amino-hexanoic acid in solid form and a pharmaceutically acceptable solid excipient.

2. The composition of claim 1, also comprising solid bismuth nitrate.

3. The composition of claim 1 in the form of granules.

4. The composition of claim 1 in dosage unit form.

References Cited

FOREIGN PATENTS

| | | | |
|---|---|---|---|
| 83 | 7/1960 | France | 424—319 |
| 2,332 | 2/1964 | France | 424—319 |
| 4,574 | 12/1966 | France | 424—319 |
| 4,873 | 4/1967 | France | 424—319 |
| 229,951 | 12/1958 | Australia | 260—534 |
| 127,203 | 11/1959 | U.S.S.R. | 424—319 |
| 1,079,569 | 8/1967 | Great Britain | 424—319 |

OTHER REFERENCES

Abstracts of Belgian Patents 732,372 and 732,373, October 1969.

ALBERT T. MEYERS, Primary Examiner

F. E. WADDELL, Assistant Examiner

U.S. Cl. X.R.

260—534; 424—Dig. 13